(12) United States Patent
Bogos

(10) Patent No.: US 7,307,518 B2
(45) Date of Patent: Dec. 11, 2007

(54) MULTI-LEVEL BRAKE LIGHT INDICATOR FOR VEHICLES

(76) Inventor: Nicholas Bogos, 699 Anderson Ave., Cliffside, NJ (US) 07010

( * ) Notice: Subject to any disclaimer, the term of this patent is extended or adjusted under 35 U.S.C. 154(b) by 170 days.

(21) Appl. No.: 11/134,732

(22) Filed: May 23, 2005

(65) Prior Publication Data
US 2006/0262553 A1    Nov. 23, 2006

(51) Int. Cl.
*B60Q 1/44* (2006.01)
(52) U.S. Cl. ...................................... 340/479; 340/467
(58) Field of Classification Search ................ 340/479, 340/467, 453, 463, 464, 468; 303/1, 3
See application file for complete search history.

(56) References Cited

U.S. PATENT DOCUMENTS

| | | | |
|---|---|---|---|
| 3,638,181 A * | 1/1972 | Bryant | 340/467 |
| 4,297,550 A * | 10/1981 | Leighton | 340/479 |
| 5,089,805 A | 2/1992 | Salsman | |
| 5,150,098 A * | 9/1992 | Rakow | 340/479 |
| D418,929 S | 1/2000 | Allen | |
| 6,054,919 A | 4/2000 | Demko | |
| 6,424,256 B1 | 7/2002 | Ryder | |
| 6,573,830 B2 * | 6/2003 | Cohen et al. | 340/479 |
| 6,600,415 B1 | 7/2003 | Li | |
| 6,642,842 B1 | 11/2003 | Khamis | |
| 6,677,855 B2 * | 1/2004 | Engelman et al. | 340/439 |
| 6,753,769 B1 | 6/2004 | Elliott | |
| 6,937,146 B2 * | 8/2005 | Tracy | 340/467 |
| 6,946,955 B2 * | 9/2005 | Golder | 340/467 |
| 7,109,857 B2 * | 9/2006 | Ross et al. | 340/479 |
| 7,145,449 B2 * | 12/2006 | Kim | 340/463 |

* cited by examiner

*Primary Examiner*—John Tweel, Jr.

(57) ABSTRACT

A vehicle safety lighting system includes a panel including light-emitting sources housed therein that are arranged in isolated series equidistantly juxtaposed along the panel. One light-emitting source series is continuously active during non-braking conditions. A mechanism is included for mounting the panel to a rear portion of a vehicle. A controller is coupled to a master brake cylinder of the vehicle and is electrically mated in parallel with the light-emitting sources such that selected ones of the light-emitting source series can be independently activated during driving conditions. In-line pressure sensors are conjoined to brake lines associated with the master brake cylinder for effectively determining a degree of force applied to a brake pedal. The in-line pressure sensors also generates and transmits notification signals to the controller while the brake pedal is engaged such that the controller can activate the light-emitting sources based upon a changing brake force.

18 Claims, 7 Drawing Sheets

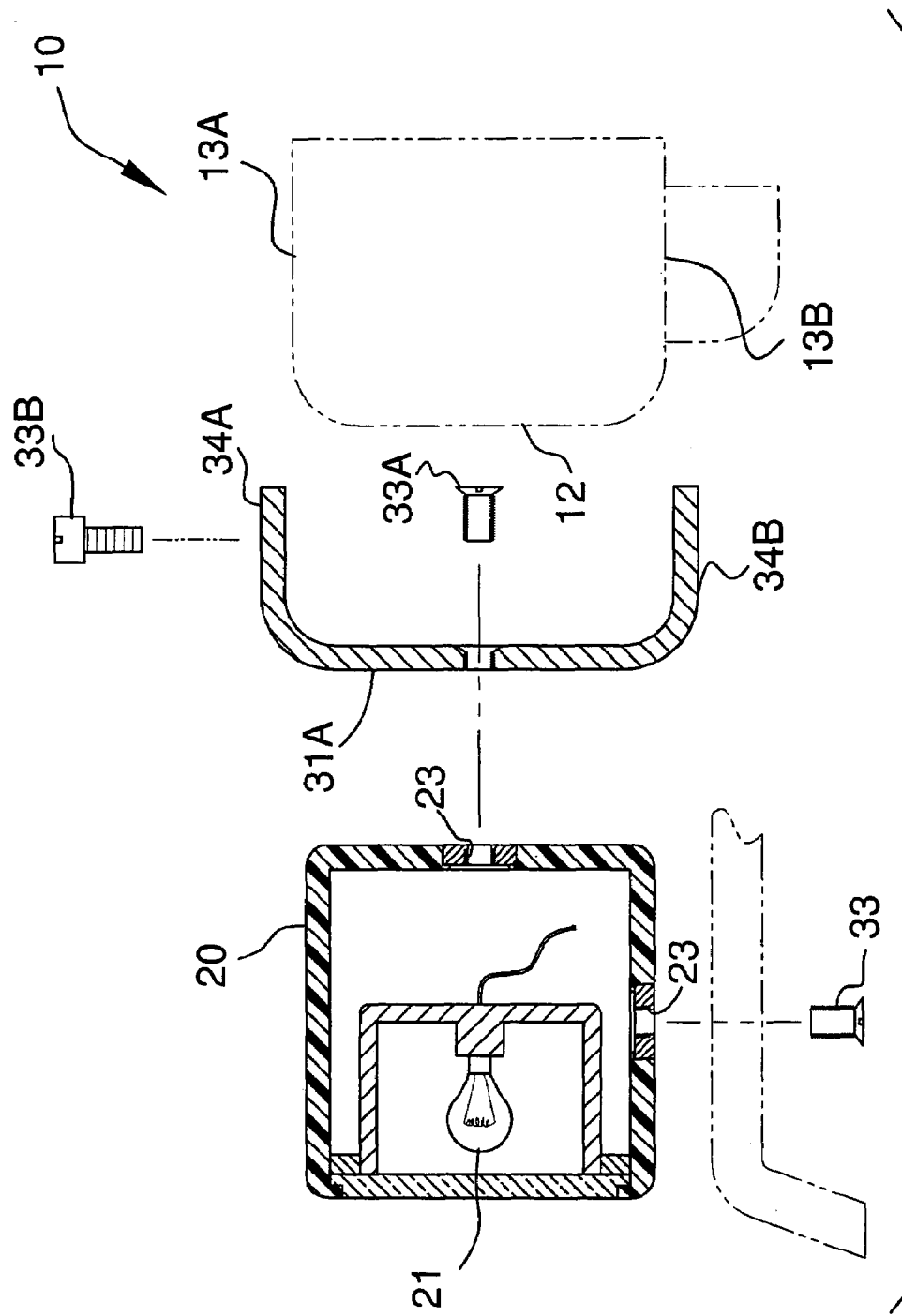

MULTI-LEVEL BRAKE LIGHT INDICATOR FOR VEHICLES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to brake light indicators and, more particularly, to a multi-level brake light indicator for vehicles.

2. Prior Art

As part of the effort to reduce automobile accidents, there has been an increasing emphasis on enhancing the visibility of brake lighting. Brake lights have become larger and more numerous, including the advent of the high mount brake light system which is mounted on the shelf under the rear window or on the trunk. However, the current state of automobile brake lighting has typically provided for only a single intensity, that is, the brake lights are either on or off. In many instances, safety would be enhanced if a driver approaching from the rear could determine at what rate the forward automobile is braking or has braked.

One example discloses a brake light having a plurality of lamps with different intensities. The low intensity lamps are energized when the brakes are first applied, and the high intensity lamps are energized by an inertia switch when a larger braking force is applied. Unfortunately, the intensity of the brake lights is only easily discernible from a close distance. This makes the system insufficient for highway driving where cars approach each other from great distances and at high speeds.

Another brake light system includes a plurality of brake lights situated on a rear of the vehicle. Each brake light has a unique size. A plunger mechanism is included for actuating the brake lights. In operation, lights of increasing size are illuminated as a brake pedal is increasingly depressed. Again, such a system is limited to close range driving situations only, since the size of the iridescent light ring formed about alternately sized light bulbs becomes increasingly difficult to discern from greater distances.

Accordingly, a need remains for a multi-level brake light indicator for vehicles in order to overcome the above-noted shortcomings. The present invention satisfies such a need by providing a brake light system that is automatically operated, increases driver safety, and is convenient. Instead of always seeing the same red brake lights when a preceding motorist applies their brakes, the system varies the color of lights according to the rate of deceleration. This enables a following motorist to better judge how to react to prevent a rear-end collision. The system can thus save lives on roadways, hold down insurance rates, and prevent unnecessary traffic jams. Such a system is also highly visible, effective, reliable, and adaptable to different vehicle applications.

BRIEF SUMMARY OF THE INVENTION

In view of the foregoing background, it is therefore an object of the present invention to provide a multi-level brake light indicator for vehicles. These and other objects, features, and advantages of the invention are provided by a vehicle safety lighting system for notifying a trailing vehicle of a leading vehicle's braking force applied during transit conditions.

The vehicle safety lighting system includes an elongated panel including a plurality of coextensive light-emitting sources housed therein. Such light-emitting sources are arranged in a plurality of isolated series equidistantly juxtaposed along a longitudinal length of the panel. Each light-emitting source preferably has a unique color associated therewith so that the trailing vehicle can advantageously readily identify the degree of the braking force. The light-emitting sources may become activated in the following color pattern: green, white, yellow, orange and red. One of the light-emitting source series is continuously active during non-braking conditions.

A mechanism is included for removably mounting the panel to a rear portion of the leading vehicle so that the trailing vehicle can advantageously and effectively maintain a continuous line of sight with the light-emitting sources during driving conditions. Such a panel mounting mechanism preferably includes a plurality of linear brackets directly conjoined to a rear bumper of the leading vehicle. Each bracket is provided with a plurality of juxtaposed apertures for selectively receiving a plurality of fastening members therethrough. The panel is provided with a plurality of threaded holes for effectively and conveniently receiving the fastening members after being passed through the apertures.

A controller is operably coupled to a master brake cylinder of the leading vehicle. Such a controller is electrically mated in parallel with the plurality of light-emitting sources such that selected ones of the light-emitting source series can be independently activated during driving conditions. The controller preferably activates the light-emitting sources along a unidirectional path for clearly notifying the trailing vehicle of the braking force intensity.

A plurality of independently operable in-line pressure sensors are directly conjoined to a plurality of brake lines associated with the master brake cylinder. Such in-line pressure sensors effectively determine a degree of force applied to a brake pedal in the leading vehicle. The in-line pressure sensors also generate and transmit a series of notification signals to the controller while the brake pedal is engaged such that the controller can selectively activate the light-emitting sources based upon a changing brake force. Such in-line pressure sensors may be threadably engaged directly with the brake lines. Each in-line pressure sensor includes an O-ring directly coupled to a bottom portion thereof for advantageously prohibiting brake fluid from exiting the brake lines.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 5 is a cross-sectional view of the panel and an associated mounting bracket.

DETAILED DESCRIPTION OF THE INVENTION

Figure 1:
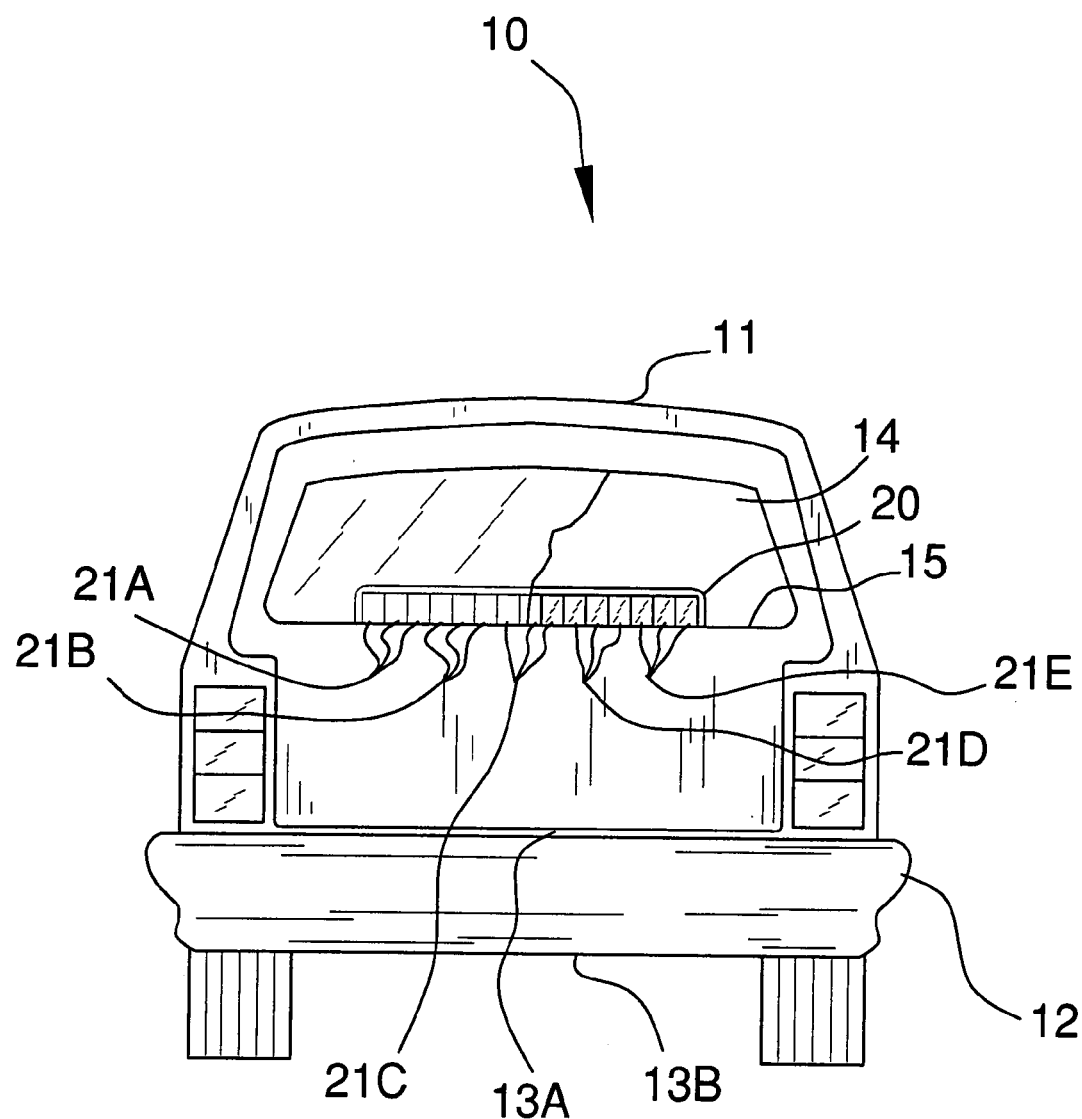
FIG. 1 is a rear-elevational view of a vehicle showing a multi-level brake light indicator, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-5 by the reference numeral 10 and is intended to provide a multi-level brake light indicator for vehicles. It should be understood that the system 10 may be incorporated into many different types of vehicles and should not be limited in use to only small passenger vehicles.

Referring initially to FIG. 1, the system 10 includes an elongated panel 20 including a plurality of coextensive light-emitting sources 21 housed therein. Of course, the panel 20 may be produced in a variety of different shapes, sizes and colors depending on the vehicle installed, as is obvious to a person of ordinary skill in the art. Such light-emitting sources 21 are arranged in a plurality of isolated series 22 equidistantly juxtaposed along a longitudinal length of the panel 20. Each light-emitting source series 22 has a unique color associated therewith, which is essential so that the trailing vehicle can advantageously readily identify the degree of the braking force.

The light-emitting sources 21 become activated in the following color pattern: green 21A, white 21B, yellow 21C, orange 21D and red 21E. Of course, alternate colors may be used for the light emitting sources 21, as is obvious to a person of ordinary skill in the art. One of the light-emitting source series 22 is continuously active during non-braking conditions. In reference to the color pattern mentioned above, the green light emitting sources 21A are continuously active, conveniently providing a trailing vehicle with a reference point for the amount of brake force being applied. From such a reference point, the trailing driver is conveniently alerted as to how much braking force they should apply in order to stop at a safe distance from the leading vehicle 11.

Figure 4:
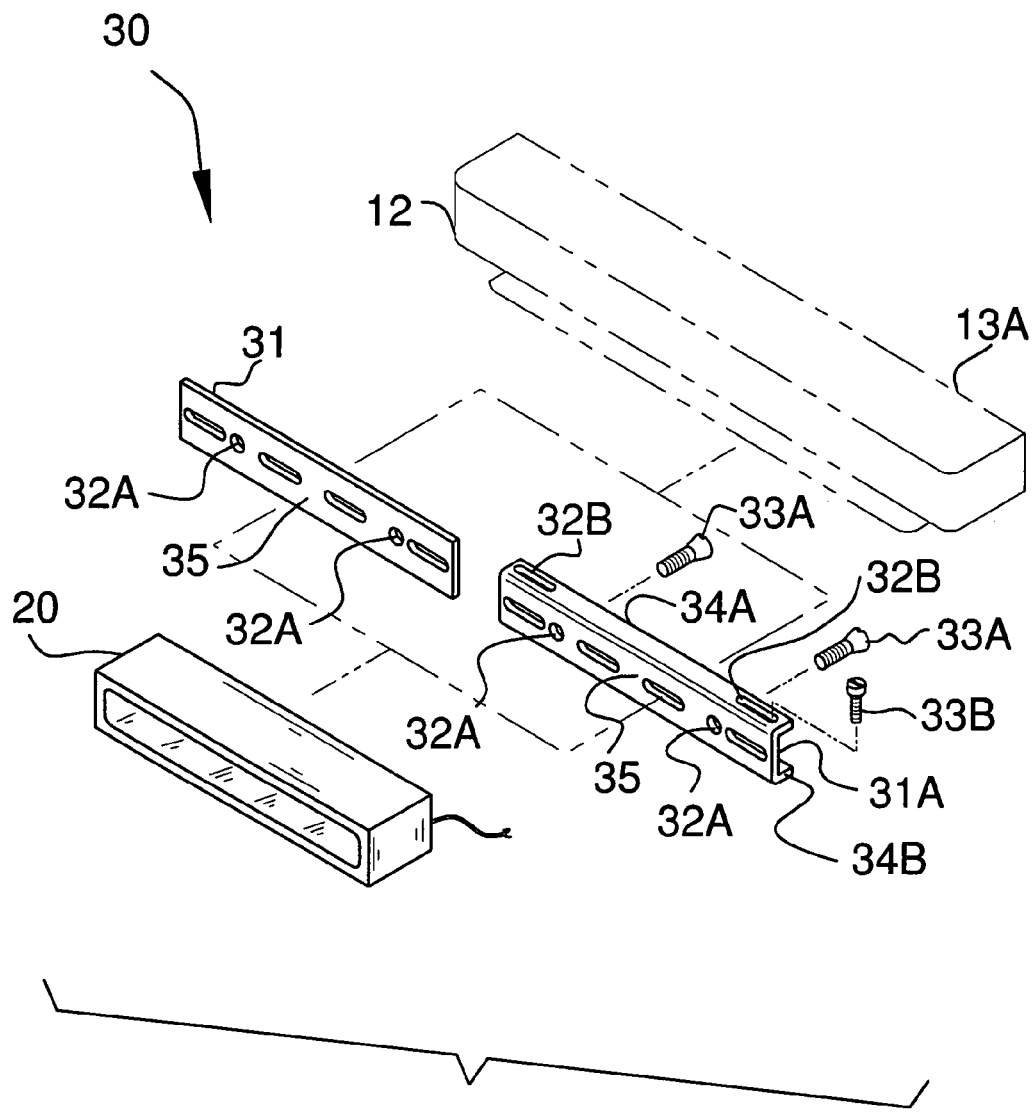
FIG. 4 is an exploded perspective view of the panel mounting mechanism.

Referring to FIGS. 4 and 5, a mechanism 30 is included for removably mounting the panel 20 to a rear portion of the leading vehicle 11, which is important so that the trailing vehicle can advantageously and effectively maintain a continuous line of sight with the light-emitting sources 21 during driving conditions. The panel mounting mechanism 30 thus provides a convenient way to incorporate the system 10 in newly produced vehicles 11, as well as aftermarket vehicles 11.

Such a panel mounting mechanism 30 includes a plurality of linear brackets 31 directly conjoined, with no intervening elements, to a rear bumper 12 of the leading vehicle 11. Of course, the panel 20 may be positioned at any other suitable location along the rear portion of the vehicle 11, such as at an interior of the vehicle 11 and along the lower edge 15 of the rear window 14, as is obvious to a person of ordinary skill in the art. Each bracket 31 is provided with a plurality of juxtaposed apertures 32A for selectively receiving a plurality of fastening members 33A therethrough. The panel 20 is provided with a plurality of threaded holes 23 that are critical for effectively and conveniently receiving the fastening members 33A after being passed through the apertures 32.

As shown in FIG. 4, one of the linear brackets 31A includes oppositely spaced top 34A and bottom 34B edge portions monolithically formed with a front face 35 thereof. Such top 34A and bottom 34B edge portions include a pair of linear apertures 32B vertically aligned; which are important so that a fastening member 33B can adjustably abut it with a top 13A and bottom 13B surface of the bumper 12. Of course, the front face 35 may be produced in a variety of different vertical lengths in order to be fitted on alternately sized bumpers 12, as is obvious to a person of ordinary skill in the art.

Figure 2A:
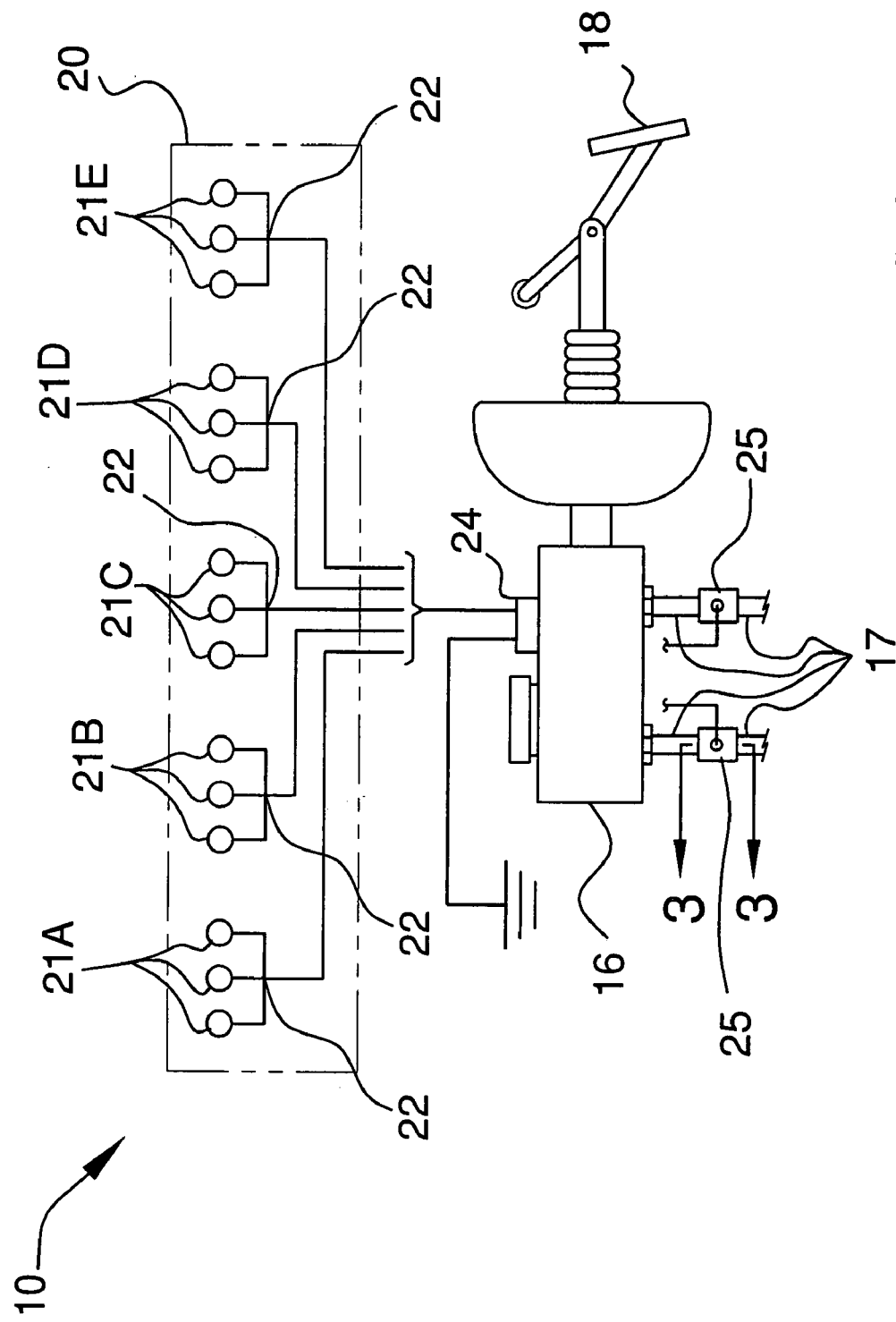
FIGS. 2a through 2c are schematic diagrams showing the system of the present invention at various stages during operating conditions.
Figure 2B:
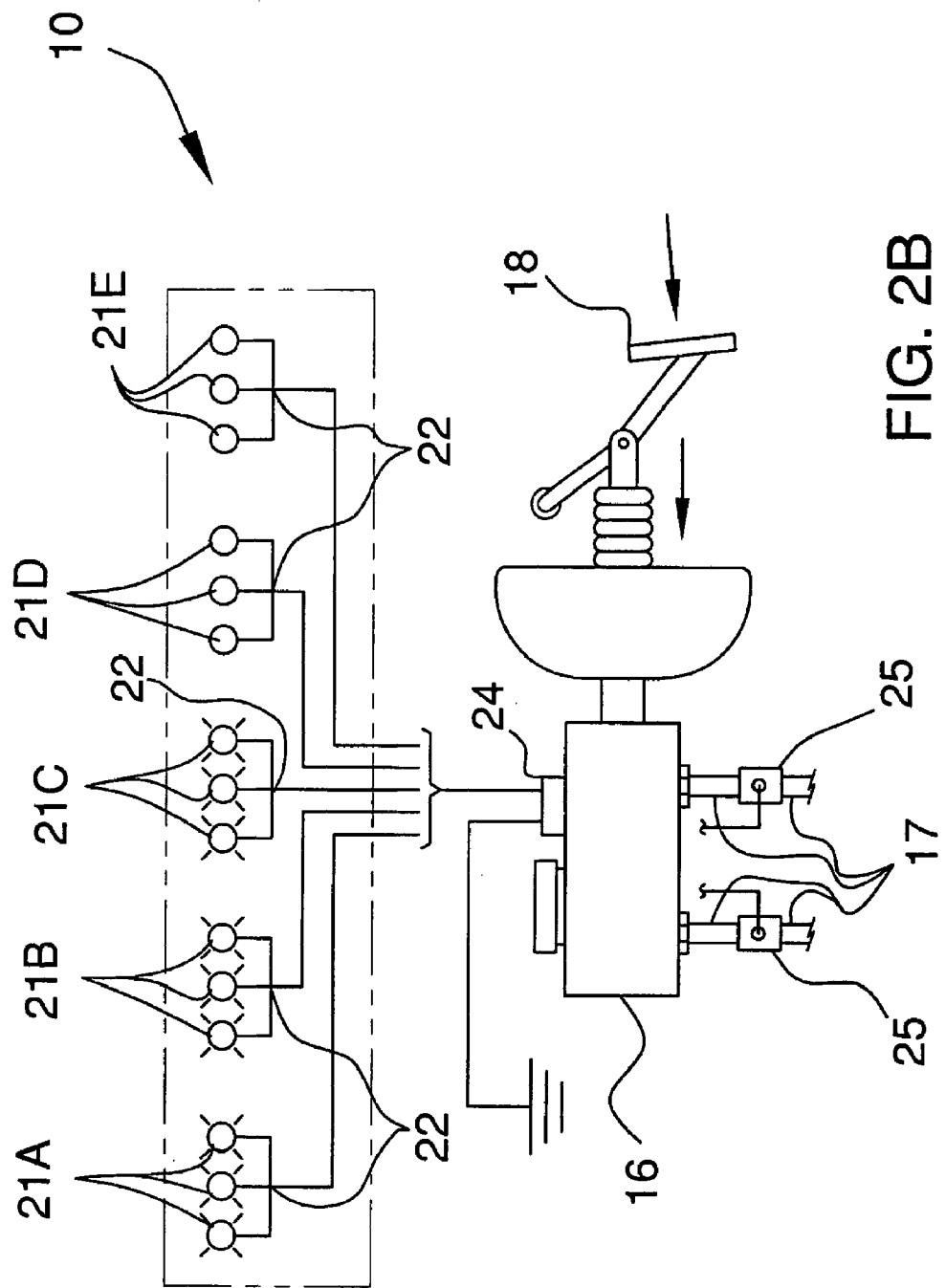
Figure 2C:
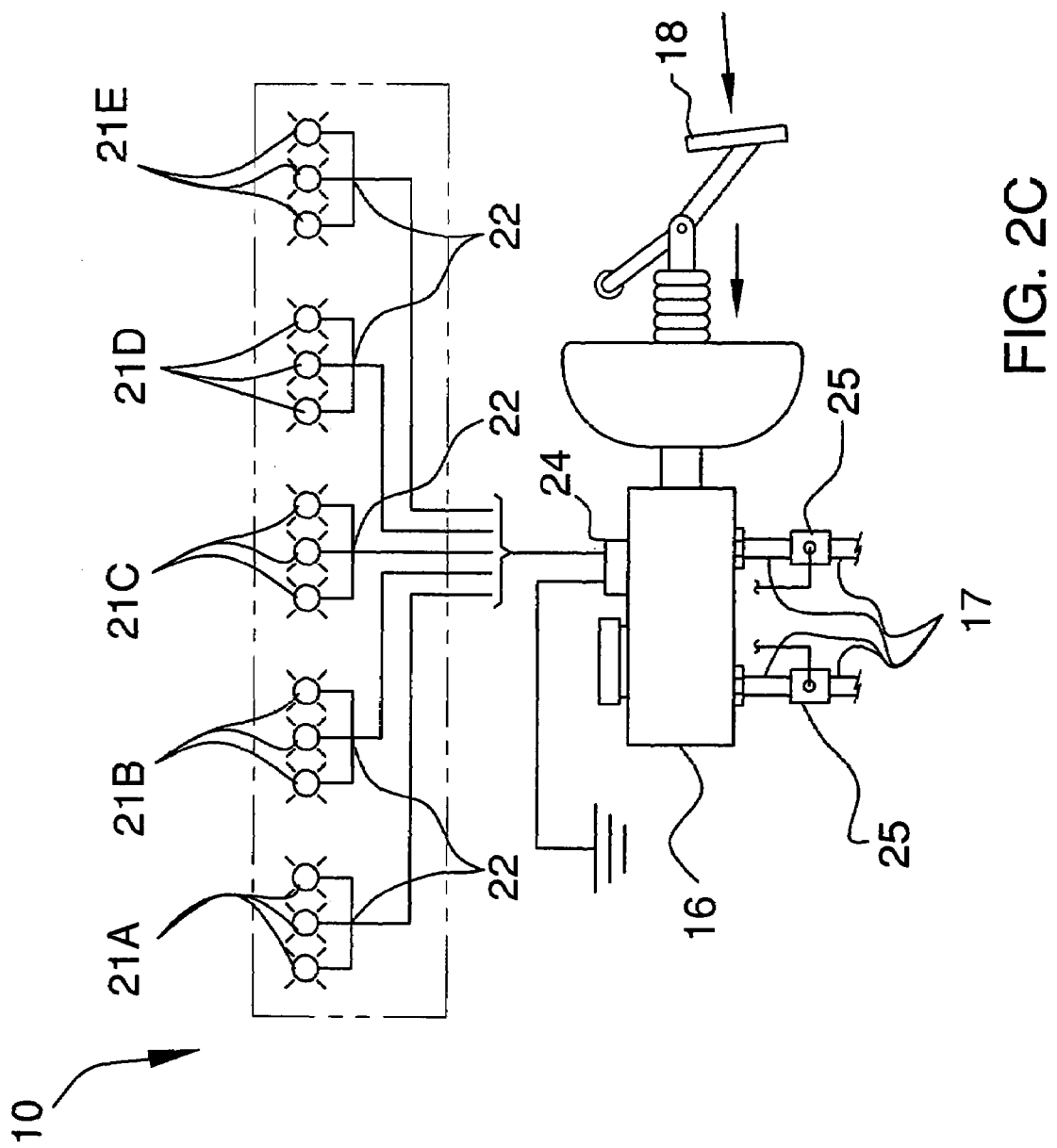

Referring to FIGS. 2a through 2c, a controller 24 is operably coupled, with no intervening elements, to a master brake cylinder 16 of the leading vehicle 11. Such a controller 24 is electrically mated in parallel with the plurality of light-emitting sources 21, which is crucial such that selected ones of the light-emitting source series 22 can be independently activated during driving conditions. The controller 24 activates the light-emitting sources 21 along a unidirectional path for clearly notifying the trailing vehicle of the braking force intensity.

Figure 3:
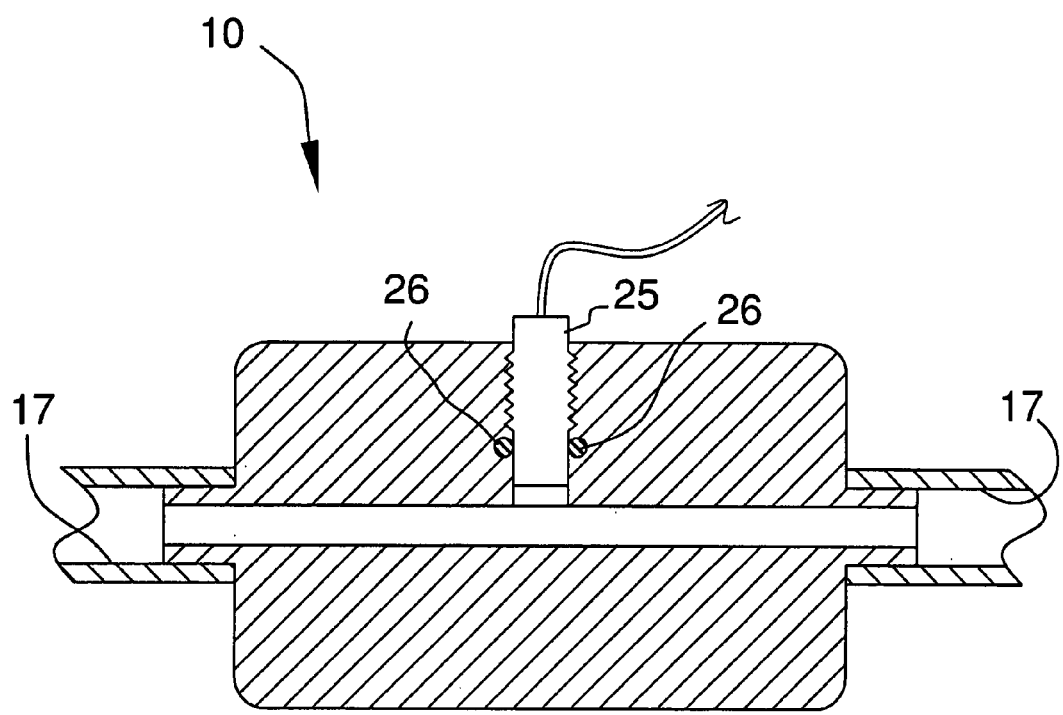
FIG. 3 is a cross-sectional view of the in-line pressure sensor shown in FIG. 2a, taken along line 3-3.

Referring to FIGS. 2a through 3, a plurality of independently operable in line pressure sensors 25 are directly conjoined, with no intervening elements, to a plurality of brake lines 17 associated with the master brake cylinder 16. Such in-line pressure sensors 25 are vital for effectively determining a degree of force applied to a brake pedal 18 in the leading vehicle 11. The in-line pressure sensors 25 also generate and transmit a series of notification signals to the controller 24 while the brake pedal 18 is engaged such that the controller 24 can selectively activate the light-emitting sources 21 based upon a changing brake force, thus advantageously and immediately alerting a trailing driver of a change in the brake force.

Such in-line pressure sensors 25 are threadably engaged directly, with no intervening elements, with the brake lines 17, as is illustrated in FIG. 3. Each in line pressure sensor 25 includes an O-ring 26 directly coupled, with no intervening elements, to a bottom portion thereof, which is advantageous and essential for prohibiting brake fluid from exiting the brake lines 17, such that the vehicle's 11 brake function is not jeopardized.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A vehicle safety lighting system for notifying a trailing vehicle of a leading vehicle's braking force applied during transit conditions, said vehicle safety lighting system comprising:
    an elongated panel including a plurality of light-emitting sources housed therein, said light-emitting sources being arranged in a plurality of isolated series equidistantly juxtaposed along a longitudinal length of said panel;
    means for removably mounting said panel to a rear portion of the leading vehicle so that the trailing vehicle can maintain a continuous line of sight with said light-emitting sources during driving conditions;
    a controller operably coupled to a master brake cylinder of the leading vehicle, said controller being electrically mated in parallel with said plurality of light-emitting sources such that selected ones of said light-emitting source series can be independently activated during driving conditions; and
    a plurality of in-line pressure sensors directly conjoined to a plurality of brake lines associated with the master brake cylinder, said in-line pressure sensors determining a degree of force applied to a brake pedal in the leading vehicle, said in-line pressure sensors generating and transmitting a series of notification signals to said controller while the brake pedal is engaged such that said controller can selectively activate said light-emitting sources based upon a changing brake force;
    wherein one said light-emitting source series is continuously active during non-braking conditions;
    wherein said controller is directly and electrically coupled to said plurality of light-emitting sources, said controller being directly and electrically coupled to said master brake cylinder.

2. The vehicle safety lighting system of claim 1, wherein said controller activates said light-emitting sources along a unidirectional path for clearly notifying the trailing vehicle of the braking force intensity.

3. The vehicle safety lighting system of claim 1, wherein each said light-emitting sources has a unique color associated therewith so that the trailing vehicle can readily identify the degree of the braking force.

4. The vehicle safety lighting system of claim 1, wherein said in-line pressure sensors are threadably engaged directly with said brake lines; each said in-line pressure sensor including an O-ring directly coupled to a bottom portion thereof for prohibiting brake fluid from exiting the brake lines.

5. The vehicle safety lighting system of claim 1, wherein said panel mounting means comprises:
    a plurality of linear brackets directly conjoined to a rear bumper of the leading vehicle, each said brackets being provided with a plurality of juxtaposed apertures for selectively receiving a plurality of fastening members therethrough, wherein said panel is provided with a plurality of threaded holes for receiving the fastening members after being passed through the apertures.

6. The vehicle safety lighting system of claim 3, wherein said light-emitting sources become activated in the following color pattern: green, white, yellow, orange and red.

7. A vehicle safety lighting system for notifying a trailing vehicle of a leading vehicle's braking force applied during transit conditions, said vehicle safety lighting system comprising:
    an elongated panel including a plurality of coextensive light-emitting sources housed therein, said light-emitting sources being arranged in a plurality of isolated series equidistantly juxtaposed along a longitudinal length of said panel;
    means for removably mounting said panel to a rear portion of the leading vehicle so that the trailing vehicle can maintain a continuous line of sight with said light-emitting sources during driving conditions;
    a controller operably coupled to a master brake cylinder of the leading vehicle, said controller being electrically mated in parallel with said plurality of light-emitting sources such that selected ones of said light-emitting source series can be independently activated during driving conditions; and
    a plurality of in-line pressure sensors directly conjoined to a plurality of brake lines associated with the master brake cylinder, said in-line pressure sensors determining a degree of force applied to a brake pedal in the leading vehicle, said in-line pressure sensors generating and transmitting a series of notification signals to said controller while the brake pedal is engaged such that said controller can selectively activate said light-emitting sources based upon a changing brake force;
    wherein one said light-emitting source series is continuously active during non-braking conditions;
    wherein said controller is directly and electrically coupled to said plurality of light-emitting sources, said controller being directly and electrically coupled said master brake cylinder.

8. The vehicle safety lighting system of claim 7, wherein said controller activates said light-emitting sources along a unidirectional path for clearly notifying the trailing vehicle of the braking force intensity.

9. The vehicle safety lighting system of claim 7, wherein each said light-emitting sources has a unique color associated therewith so that the trailing vehicle can readily identify the degree of the braking force.

10. The vehicle safety lighting system of claim 7, wherein said in-line pressure sensors are threadably engaged directly with said brake lines, each said in-line pressure sensor including an O-ring directly coupled to a bottom portion thereof for prohibiting brake fluid from exiting the brake times.

11. The vehicle safety lighting system of claim 7, wherein said panel mounting means comprises:
    a plurality of linear brackets directly conjoined to a rear bumper of the leading vehicle, each said brackets being provided with a plurality of juxtaposed apertures for selectively receiving a plurality of fastening members therethrough, wherein said panel is provided with a plurality of threaded holes for receiving the fastening members after being passed through the apertures.

12. The vehicle safety lighting system of claim 9, wherein said light-emitting sources become activated in the following color pattern: green, white, yellow, orange and red.

13. A vehicle safety lighting system for notifying a trailing vehicle of a leading vehicle's braking force applied during transit conditions, said vehicle safety lighting system comprising:

an elongated panel including a plurality of coextensive light-emitting sources housed therein, said light-emitting sources being arranged in a plurality of isolated series equidistantly juxtaposed along a longitudinal length of said panel;

means for removably mounting said panel to a rear portion of the leading vehicle so that the trailing vehicle can maintain a continuous line of sight with said light-emitting sources during driving conditions;

a controller operably coupled to a master brake cylinder of the leading vehicle, said controller being electrically mated in parallel with said plurality of light-emitting sources such that selected ones of said light-emitting source series can be independently activated during driving conditions; and a plurality of independently operable in-line pressure sensors directly conjoined to a plurality of brake lines associated with the master brake cylinder, said in-line pressure sensors determining a degree of force applied to a brake pedal in the leading vehicle, said in-line pressure sensors generating and transmitting a series of notification signals to said controller while the brake pedal is engaged such that said controller can selectively activate said light-emitting sources based upon a changing brake force;

wherein one said light-emitting source series is continuously active during non-braking conditions;

wherein said controller is directly and electrically coupled to said plurality of light-emitting sources, said controller being directly and electrically coupled to said master brake cylinder.

14. The vehicle safety lighting system of claim 13, wherein said controller activates said light-emitting sources along a unidirectional path for clearly notifying the trailing vehicle of the braking force intensity.

15. The vehicle safety lighting system of claim 13, wherein each said light-emitting sources has a unique color associated therewith so that the trailing vehicle can readily identify the degree of the braking force.

16. The vehicle safety lighting system of claim 13, wherein said in-line pressure sensors are threadably engaged directly with said brake lines, each said in-line pressure sensor including an O-ring directly coupled to a bottom portion thereof for prohibiting brake fluid from exiting the brake lines.

17. The vehicle safety lighting system of claim 13, wherein said panel mounting means comprises:

a plurality of linear brackets directly conjoined to a rear bumper of the leading vehicle, each said brackets being provided with a plurality of juxtaposed apertures for selectively receiving a plurality of fastening members therethrough, wherein said panel is provided with a plurality of threaded holes for receiving the fastening members after being passed through the apertures.

18. The vehicle safety lighting system of claim 15, wherein said light-emitting sources become activated in the following color pattern: green, white, yellow, orange and red.

* * * * *